United States Patent Office 3,579,340
Patented May 18, 1971

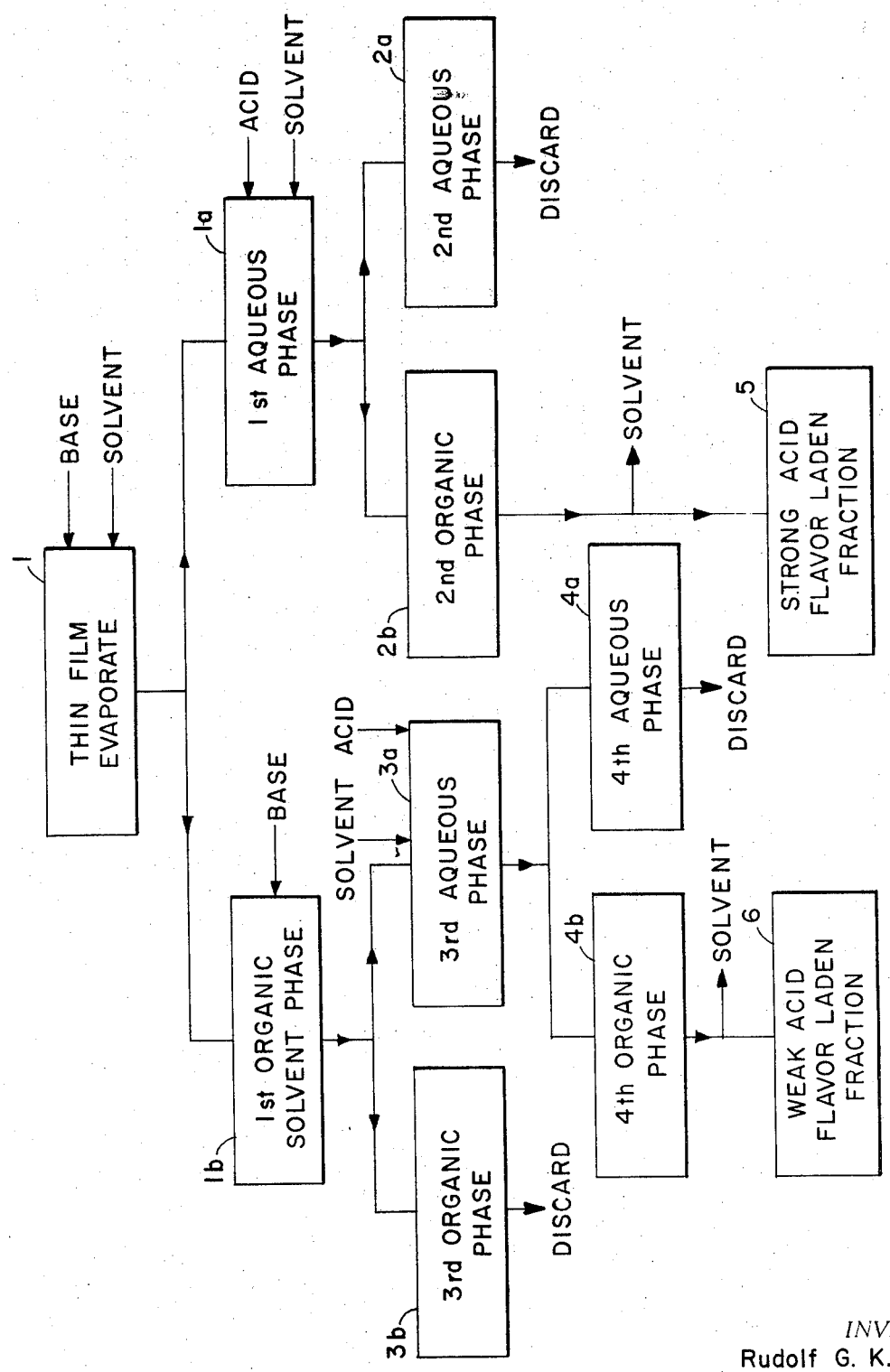

3,579,340
ISOLATING ACIDIC MATERIALS FROM A THIN FILM EVAPORATE
Rudolf G. K. Strobel, Colerain Township, Cincinnati, Ohio, assignor to The Procter & Gamble Company, Cincinnati, Ohio
Filed May 8, 1969, Ser. No. 822,943
Int. Cl. A23f 1/08, 1/04
U.S. Cl. 99—71
17 Claims

ABSTRACT OF THE DISCLOSURE

Coffee flavor present in a thin film evaporate consists of both beneficial and detrimental flavor constituents. Disclosed is a process of separating beneficial constituents frome detrimental constitutents by an acid/base liquid/liquid extraction process. The thin film evaporate is separated into acid fractions, a basic fraction and a neutral fraction. The basic and neutral fractions are detrimental and are discarded. The acidic fractions are beneficial and are added back to dry soluble coffee to provide improved flavor.

BACKGROUND OF THE INVENTION

For many years attempts have been made to make the flavor characteristics of instant coffee more nearly approach the flavor characteristics of a cup of freshly brewed roast and ground coffee. To counteract flavor losses during instant coffee production, numerous processing suggestions have been made. For instance, a steam distillate produced by steam distilling roast and ground coffee is often added back to the processing stream just prior to drying. Another common flavor addition procedure is to spray coffee aromatizing oil on dry instant coffee. Still another flavor improvement process involves adding back to the instant coffee process stream a thin film evaporate produced during a thin film evaporation concentration step. Broadly, this invention relates to further processing of thin film evaporates.

In the production of instant coffee an essential operation is the extraction of water soluble components from ground previously roasted coffee. The aqueous extract thus formed is ultimately dried to produce instant coffee product. A concentration step involving removal of some of the water is sometimes employed subsequent to the extraction step and previous to the drying step.

This concentration step has the advantage of reducing the load on the drying system. It has an additional advantage when spray drying is the drying method utilized; this is because, in a spray drying operation, the drying of aqueous coffee solutions having high concentrations of coffee solubles (i.e. more than about 45% by weight concentrations) it is generally accompanied by much less flavor loss than results when drying coffee solutions having evaporation procedures.

One conventional technique for extract concentration is thin film evaporation. This concentrating method is advantageous because it permits continuous operation. Also it does not require solids handling such as is necessary in freeze concentration and coffee powder addition methods of concentration.

Thin film evaporation can be carried out by the falling film, rising film, rising-falling-film and wiped or scraped film evaporation operations. A falling film operation is preferred because it permits the closest control of pressure conditions which is desirable in thin film evaporation procedures.

Thin film evaporation can be carried out in conventional commercially obtainable equipment. For example, a typical commercially available falling-film evaporator comprises a vertically oriented shell-and-tube heat exchanger wherein the evaporation zone is in any or all of the tubes of the exchanger. The aqueous coffee extract can be distributed into the tubes of the exchanger by a conventional distributor, for example, a sieve or screen member. The heat exchange fluid, for example, steam or hot water is fed into and exits from the exchanger shell. As the water in the extract vaporizes it migrates to the central portion of its tube pushing the liquid against the sides of the tube as a thin film. The temperature is maintained by the type and amount of heat exchange fluid. The pressure is maintained by a vacuum device, for example a vacuum pump or steam ejector down stream of the evaporator.

Utilizing a thin film evaporator such as that described above, aqueous coffee extract emerging from a countercurrent extraction train is formed into a thin film wherein evaporation of a portion of the water in the extract column is accomplished. The result is that the aqueous extract becomes highly concentrated and the removed water is thereafter condensed to form a thin film evaporate.

SUMMARY OF THE INVENTION

This invention relates to isolation of advantageous acid flavor laden fractions from a thin film evaporate. A thin film evaporate is separated by an acid/base liquid/liquid phase extraction procedure into undesirable basic and neutral fractions which are discarded and desirable acid flavor laden fractions which are utilized. In a preferred embodiment, weak acid flavor laden fraction and strong acid flavor laden fraction are isolated from the thin film evaporate. In a broader, but less preferred operation a single acid flavor laden fraction which contains a mixture of strong acid and weak acid components is isolated from the thin film evaporate. In a most preferred embodiment, only a weak acid flavor laden fraction is isolated from the thin film evaporate. The acid flavor laden fractions isolated from a thin film evaporate by the process of this invention can be sprayed upon dry instant coffee at from 100 p.p.m. to about 5000 p.p.m. to provide a flavor enhanced instant coffe product.

Most particularly, one embodiment of the invention comprises a process of isolating from a thin film evaporate a strong acid flavor laden fraction and a weak acid flavor laden fraction, said process comprising the steps of:

(a) Admixing with said thin film evaporate alkali basic material and water immiscible organic solvent to form a first aqueous phase and a first organic solvent phase, said basic material being added in a sufficient amount to provide a pH in the range of from 8.0 to 9.5 and said organic solvent being added on a volume basis at a ratio of from 3:1 to 1:20 of organic solvent to thin film evaporate; and thereafter, (b) Separating said first aqueous phase from said first organic solvent phase; and thereafter, (c) Admixing with said first aqueous phase strong inorganic acid and water immiscible organic solvent to provide a second aqueous phase and a second organic solvent phase, said strong inorganic acid being added in a sufficient amount to provide a pH within the range of from 1.0 to 3.0 and said organic solvent being added on a volume basis at a ratio of from 3:1 to 1:20 of organic solvent to first aqueous phase; and thereafter, (d) Discarding said second phase and evaporating from said second organic solvent phase said organic solvent to yield a residue of a strong acid flavor laden fraction; and (e) Admixing with said first organic solvent phase alkali basic material to form a third aqueous phase and a third organic solvent phase, said basic material being added in a sufficient amount to provide a pH within the range of from 9.6 to 13.0; and thereafter, (f) Discarding said third organic solvent phase and admixing with said third aqueous phase strong inorganic acid and water immiscible organic solvent to provide a fourth aqueous phase and a fourth organic solvent phase, said inorganic acid being added in a sufficient amount to provide a pH within the range of from 1.0 to 6.0 and said organic solvent being added on a volume basis at a ratio of from 3:1 to 1:20 of organic solvent to third aqueous phase; and thereafter, (g) Discarding said fourth aqueous phase and evaporating said fourth organic solvent phase to yield a residue of a weak acid flavor laden fraction.

BRIEF DESCRIPTION OF THE DRAWING

The figure herein is a block diagram flow chart outlining the process of isolating acid flavor laden fractions from a thin film evaporate. The following phrases used in the specification and claims have been abbreviated on the drawing: Alkali basic material has been shortened to "base"; water immiscible organic solvent has been shortened to "solvent"; and strong inorganic acid has been shortened to "acid."

DETAILED DESCRIPTION OF THE INVENTION

Instant coffee processing typically involves three steps: Extraction of previously roasted and ground coffee in an extraction train, followed by concentration of the aqueous extract which is emitted from the extraction train, and finally drying of the concentrated aqueous coffee extract to provide a dry instant coffee.

This invention relates to the concentration step and more specifically to thin film evaporation concentration. Adding back a thin film evaporate to an instant coffee processing stream is not new in the art. For instance, see copending and commonly assigned application Lombana and Strang entitled, "Preparation of Instant Coffee," filed July 19, 1968, Ser. No. 746,234. Additionally Bonotto, U.S. Pat. 2,903,359 discloses isolating flavor enhanced acidic fractions from an extract during concentration. Byer, U.S. Pat. 3,244,530, shows treatment of a thin film evaporate to separate the evaporate into detrimental and beneficial fractions. Heretofore, it has not been known that a thin film evaporate consists of detrimental, neutral and basic fractions and beneficial strong acid and weak acid flavor laden fractions. In this invention an acid/base liquid/liquid phase extraction process is utilized to separate a thin film evaporate into these fractions.

It has been found that a thin film evaporate can be separated into four fractions. These are a neutral fraction, a basic fraction, a strong acid flavor laden fraction, and a weak acid flavor laden fraction. The neutral fraction is undesirable because it contributes a woody, bitter and astringent flavor and is, therefore, discarded. The basic fraction is undesirable in that it contributes a heavy chocolate-like or chicory flavor and is, therefore, discarded; the strong acid flavor laden fraction contributes a fruity, blueberry-like flavor note which is deemed desirable by the consumer; and the weak acid flavor laden fraction contributes a surprisingly brew-like flavor and aroma which makes an instant coffee product flavored therewith much smoother and more desirable.

The thin film evaporate is separated into neutral, basic, strong acid and weak acid components by utilization of careful pH control and solubility differences of the flavor components in aqueous solvents and organic solvents which are immiscible with the aqueous solvents. Hereinafter, such a phase extraction procedure will be generically referred to as an acid/base liquid/liquid phase extraction procedure.

For clarity of description the following discussion will be in terms of steps as shown in the summary of the invention. Reference will also be made to the accompanying flow diagram.

The reaction vessel, water immiscible organic solvent and alkali basic material will be described in detail only with reference to step (a); however, the description given herein is equally applicable to the other processing steps which embody each of these reactants. Likewise, in discussing each of the subsequent steps of (b) through (g) when each new type of component is introduced into the system a detailed description of that type of component will be given only with reference to the particular step in which it is first introduced. In other words the acids, basic materials or solvents suitable for a subsequent step are the same as those suitable for a previous step.

In step (a) a thin film evaporate 1, obtained from an aqueous coffee extract which has been concentrated by thin film evaporation is admixed with alkali basic material and water immiscible organic solvent whereby a first aqueous phase 1a, and a first organic solvent phase 1b, are formed. As used herein the phrase "organic solvent phase" is used interchangeably with the phrase "organic phase."

The alkali basic material can be a hydroxide of any one of the group I metals, such as sodium hydroxide or potassium hydroxide, or it can be the carbonate or bicarbonate salt of the corresponding group I metals.

The water immiscible organic solvent can be any water immiscible organic solvent having a boiling point lower than the boiling point of water. Suitable solvents can be selected from the group consisting of benzene, hexane, heptane, diethyl ether and chlorinated hydrocarbons such as trichloroethylene, carbon tetrachloride, methylene chloride, and ethylene dichloride. From a processing standpoint the preferred water immiscible organic solvent is diethyl ether, hereinafter referred to as ether. If desired, mixtures of suitable solvents can also be employed.

In step (a) it is essential that the alkali basic material be added in a sufficient amount to provide a pH of from 8.0 to 9.5. If an amount of basic material insufficient to provide a minimum pH of 8.0 is added, the strong acid flavor laden fraction 5, is not transformed into a metal salt form in which it becomes soluble in the first aqueous phase 1a. On the other hand, if the alkali basic material is added in an amount which increases the pH above 9.5, the weak acid flavor laden fraction 6, is also solubilized in the first aqueous phase 1a. Thus, to effect a separation of the strong acid flavor laden fraction 5, and the weak acid flavor laden fraction 6, the pH must not exceed 9.5.

The water immiscible organic solvent is admixed with the thin film evaporate 1, at a volume ratio of from 3:1 to 1:20 of organic solvent to thin film evaporate, and preferably at a volume basis ratio of from 2:1 to 1:3. Adding the water immiscible organic solvent within the above prescribed ratios has been found to provide the most economically feasible process. If amounts greater than three times the amount of thin film evaporate 1, are utilized, the amount of water immiscible organic solvent becomes too great and the necessity for unnecessarily long evaporation steps comes into being. On the other hand, if amounts less than 1 part of water immiscible organic solvent to 20 parts of thin film evaporate 1, are utilized, there is insufficient water immiscible organic solvent to provide the necessary extraction separation of this invention.

The alkali basic material, water immiscible organic solvent and thin film evaporate 1, can be admixed in any suitable vessel which provides uniform admixing and thorough interface contact between the immiscible first aqueous phase 1a, and the first or organic solvent phase 1b. It is preferred that the admixing vessel be provided with a means of agitating the two liquid phases so as to enable exhaustive extraction of the component parts of the thin film evaporate 1. The vessel should also be provided with an adequate draw off valve for separating the two phases after complete extraction has occurred. Suitable vessels for use in this and the following steps are a common separatory funnel and a continuous liquid/liquid glass extraction vessel wherein a flask of the organic solvent phase is continuously refluxing and condensing into an extraction vessel containing the aqueous phase. In this manner the aqueous phase is continuously being purged with organic solvent phase.

No criticality exists in regard to time of contact between the first aqueous phase 1a, and the first organic solvent phase 1b. Generally suitable intermixing and extraction takes place in from 2 minutes to 24 hours.

Likewise no criticality exists with regard to the temperatures employed in this extraction process. Generally, no particular advantage is gained by employing temperatures other than ambient temperatures. Of course, the temperature employed must not be higher than the boiling point of either water or the water immiscible organic solvent.

In step (b) the intermixed first aqueous phase 1a, and first organic solvent phase 1b, are separated. The separation is accomplished by simply allowing the two immiscible phases to separate into layers and subsequently drawing off each of the layers into separate vessels.

In step (c) the first aqueous phase 1a, is admixed with strong inorganic acid and an additional amount of the water immiscible organic solvent to form a second aqueous phase 2a, and a second organic solvent phase 2b.

The ratio of organic solvent to first aqueous phase is the same as that given above in step (a) for organic solvent to thin film evaporate.

It is essential that the strong inorganic acid be added to the first aqueous phase 1a, in an amount sufficient provide a pH within the range of from 1.0 to 3.0 and preferably from 1.5 to 2.5. The pH should be adjusted to within this range because at lower pH's portions of the strong acid flavor laden fraction 5, polymerize and at pH's higher than 3.0 the amount of acid present is insufficient to convert desirably flavored alkali salts contained in the first aqueous phase 1a, into water-insoluble acid form which is soluble in the second organic solvent phase 2b.

Suitable strong inorganic acids capable of being utilized in step (c) are, for example, hydrochloric acid and sulfuric acid. From a processing standpoint a most preferred acid is hydrochloric acid.

In step (d) a second aqueous phase 2a, which contains undesirable basic and neutral fractions, is separated and discarded. Separation can be accomplished by allowing the immiscible second aqueous phase 2a, and second organic solvent phase 2b, to stand for from 2 minutes to 24 hours after which the phases can be separated by draw off from an appropriate exit valve.

The second organic solvent phase 2b, contains the desirable strong acid flavor laden fraction 5, dissolved in the water immiscible organic solvent. The strong acid flavor laden fraction 5, can be obtained by evaporating the second organic solvent phase 2b, therefrom.

It is preferred that prior to evaporation of the second organic solvent phase 2b, that residual traces of the aqueous phase 2a, be removed by contacting the second organic solvent phase 2b, with an appropriate desiccant such as anhydrous sodium sulfate, anhydrous magnesium sulfate or anhydrous calcium chloride. The amounts of anhydrous desiccants utilized in this preferred additional step should be from about 1/20 to about 1/10 the weight of the second organic solvent phase 2b. The anhydrous desiccant is simply admixed with the second organic solvent phase 2b, agitated therewith and thereafter filtered off. Subsequently, the second organic solvent phase 2b can be evaporated at temperatures above the boiling point of the water immiscible organic solvent but below the boiling point of water, leaving as a residue the desirable strong acid flavor laden fraction 5.

In step (e) the first organic solvent phase 1b, is admixed with alkali basic material to form a third aqueous phase 3a, and a third organic solvent phase 3b.

The basic material is added in a sufficient amount to provide a pH within the range of from 9.6 to 13.0. It has been found that if the pH employed is less than 9.6 the weak acid flavor laden fraction 6, is not converted to its salt form and solubilized in the third aqueous phase 3a. On the other hand, if the pH exceeds 13.0 the process becomes less economical and less feasible to operate. In short, there is no partciular reason why higher pH's should be employed. It is preferred that the pH in step (e) be adjusted to within the range of from 11.0 to 12.0.

After thorough mixing and exhaustive extraction for a period of 2 minutes to about 24 hours the third organic solvent phase 3b, which contains the undesirable basic and neutral fractions is separated from the third aqueous phase 3a, and discarded. The method of separation of the third organic solvent phase 3b, from the third aqueous phase 3a, is by selectively drawing off from the extraction vessel, through an appropriate exit valve the two immiscible phases or layers.

In step (f), after discarding the third organic solvent phase 3b, the third aqueous phase 3a, is admixed with strong inorganic acid and water immiscible organic solvent to provide a fourth aqueous phase 4a, and a fourth organic solvent phase 4b. Suitable inorganic acids are those previously described with regard to step (c). The amount of strong inorganic acid added in step (f) is an amount sufficient to provide a pH within the range of from 1.0 to 6.0 with a pH of from 2.0 to 4.0 being preferred. In regard to the lower pH limit of 1.0 more acid solutions should not be employed as higher concentrations of acid tend to polymerize the weak acid flavor laden fraction, and destroy its flavor. On the other hand, the pH must not be greater than 6.0 because higher pH's would be insufficient to solubilize the weak acid flavor laden fraction 6, in the fourth organic phase from which it is recovered.

After thorough intermixing and exhaustive extraction for a period of 2 minutes to 24 hours the fourth organic solvent phase 4b, and the fourth aqueous phase 4a, are separated in accord with techniques previously described.

The fourth aqueous phase 4a, containing neutral and basic flavor fractions, is thereafter discarded. However, if desired, prior to discarding the fourth aqueous phase 4a, can again be treated as in step (f) to extract residual amounts of weak acid flavor laden fraction 6, that might be contained therein. The additional organic phase is then combined with the fourth organic solvent phase 4b, for treatment in step (g). This procedure can also be employed in step (d) prior to discarding the second aqueous phase 2a.

In step (g) the fourth organic solvent phase 4b, containing the weak acid flavor laden fraction 6, is treated to remove the organic solvent. The weak acid flavor laden fraction 6, can be separated from the fourth organic solvent phase 4b, by evaporating the fourth organic solvent phase at a temperature above the organic solvent boiling point, but below the boiling point of water. The residue is the weak acid flavor laden fraction 6. As previously described in relationship to step (d) a preferred method of operation is, prior to evaporation, to contact the fourth organic solvent phase 4b, containing the weak acid flavor laden fraction 6, with an appropriate desiccant. In this manner residual traces of the fourth aqueous phase 4a, are removed from the fourth organic solvent phase 4b.

The above described process comprising steps (a) through (g) is a preferred operation of the process of this invention whereby a thin film evaporate 1, is separated into a strong acid flavor laden fraction 5, and a weak acid flavor laden fraction 6. In a most preferred operation of the process of this invention a thin film evaporate 1, is treated so as to effect separation of only a weak acid flavor laden fraction 6. It is a most preferred operation because the weak acid flavor laden fraction 6, improves soluble coffee flavor more than the strong acid flavor laden fraction 5. This most preferred process is substantially the same as that previously described except that the first aqueous phase 1a, is discarded. The first organic solvent phase 1b, is treated as previously described. In regard to the overall process shown in the summary of the invention, this most preferred process involves steps (a), (b), (e), (f) and (g). Similarly a process which results in isolation of only the strong acid flavor laden fraction 5, involves discarding the first organic solvent phase 1b, and treating only the first aqueous phase 1a. This process involves steps (a), (b), (c) and (d).

In an alternative but less preferred operation of the process of this invention, a single acid flavor laden fraction is produced which is a combination of weak and strong acid flavor laden fractions. In this alternative method, the pH in step (a) of the above-described process is adjusted to a pH of from 10.0 to 13.0 and preferably from 11.0 to 12.0. In this manner, all of the acid flavor laden components are solubilized in the first aqueous phase 1a; consequently, the first organic solvent phase 1b, can be discarded. Thereafter the first aqueous phase is treated exactly as described previously in steps (a) through (d), the only difference being that the product of this process is not a strong acid flavor laden fraction 5, as in the preferred process, but a single acid flavor laden fraction which is composed of both strong acids and weak acids. This process is less preferred as the highly basic pH utilized in step (a) tends to polymerize and thus deflavor a portion of the weak acids.

All of the above isolated acidic flavor laden fractions when sprayed upon or otherwise added to or admixed with dry instant coffee at from 100 p.p.m. to 5000 p.p.m. provide an enhancement in brew-like qualities of the instant coffee. Specifically the strong acid flavor laden fraction 5, imparts a fruity blueberry-like flavor note and the weak acid flavor laden fraction imparts a rich natural brew-like coffee flavor. A preferred level of addition of these acid flavor laden fractions to dry instant coffee is from 500 p.p.m. to 700 p.p.m.

The method of addition of the acid flavor laden fractions to dry instant coffee is not critical; however, a preferred method of addition is by spraying in a manner substantially similar to the method of spraying coffee oil on instant coffee as shown in Sivetz, Coffee Processing Technology, 3rd edition, vol. 2, ch. 14. From a processing efficiency standpoint a preferred way of addition is by admixing coffee oil and acid flavor laden fractions and spraying both on instant coffee in one operation.

Both the weak acid flavor laden fraction and the strong acid flavor laden fraction alone or in combination can be utilized to improve the flavor of dry instant coffee. In regard to combinations of both acid fractions the determination of the specific weight ratio is dependent upon the flavor notes one wishes to accent. For example, smooth in taste, highly odoriferous dry instant coffee product is produced when a substantial portion of the combination is the strong acid flavor laden fractions 5, and rich natural roast and ground coffee flavor is accented by substantial portions of the combination being the weak acid flavor laden fraction 6. Of course, the single acid flavor laden fraction of the less preferred process described above can also be utilized to flavor dry instant coffee. It can be added to dry instant coffee at the same ranges as given above in regard to the weak acid flavor laden fraction 6, and strong acid flavor laden fraction 5. It has been found that when the flavor additive is a single acid flavor laden fraction as produced in the broader but less preferred process, the dry instant coffee flavor tends to be dominated by the flavor characteristics of the strong acid component; consequently, utilization of a single acid flavor laden fraction produced by the less preferred process is not as advantageous as utilization of the completely separated acid fractions. Of the acid fractions described herein, the most preferred flavor additive from the standpoint of consumer acceptability is the weak acid flavor laden fraction 6.

While the foregoing description has been with particular reference to addition of isolated acid fractions to dry instant coffee, they can also be sprayed upon roast and ground coffee to accentuate, or act as substitutes for, the flavor of highly aromatic coffees such as Ethiopians. The level of addition is the same as for dry instant coffee.

In the following examples thin film evaporate (1) was obtained as needed from a coffee extraction pilot plant. The pilot plant consisted of a six column extraction train wherein each column was 4 feet long and had a 6 inch inside diameter. The columns were connected to one another by a liquid outlet line and liquid inlet line. The extraction column packing density ranged from 19.2 lbs./cu. ft. to 20.4 lbs./cu. ft. The extraction train was run using conventional extraction conditions. Beginning with the column containing the most nearly exhausted coffee grounds and thereafter progressing sequentially to the column containing the freshest coffee grounds, the inlet temperature of each column was as follows: 360° F., 350° F., 325° F., 310° F., 280° F. and 230° F. The pressure employed during the extraction was 150 p.s.i.g. The cycle time of the extraction was 20 minutes The draw off ratio was 2.0.

The extract was drawn off from the liquid outlet line of the column containing the freshest coffee grounds. The extract was concentrated by thin film vacuum evaporation until the coffee solubles content was about 50%. The concentrate was then spray dried to a moisture content of about 3.5% in a conventional 6 ft. by 15 ft. spray dryer using an air inlet temperature of 470° F., an air outlet temperature of 200° F. and a nozzle pressure of 500 p.s.i.g. Portions of the dry soluble coffee product prepared as described above were utilized as needed in making the subsequently described flavor tests.

The evaporate from the thin film vacuum evaporation was preserved and utilized as needed in the following examples which are offered to further illustrate but not limit the disclosed invention.

EXAMPLE I

Two thousand five hundred milliliters of thin film evaporate 1, prepared as described above was made basic with 16 grams of sodium bicarbonate. The amount of sodium bicarbonate added was sufficient to increase the pH of the thin film evaporate 1, to 8.0. Thereafter 3500 milliliters of ether was added to the thin film evaporate-sodium bicarbonate mixture and all of the components were placed in a continuous liquid/liquid glass extraction vessel and allowed to remain in contact overnight, i.e., for about 16 hours. The ratio of organic solvent to thin film evaporate was 1.2:1. Thereafter, the mixture was separated into a first aqueous phase 1a, and a first organic solvent phase 1b. The first organic solvent phase 1b was dried with 16 grams of anhydrous magnesium sulfate and thereafter filtered. The first aqueous phase 1a was made strongly acid to a pH of 1.0 by the addition of 50 milliliters of 10 molar hydrochloric acid. Thereafter, the mixture of the first aqueous phase 1a and the hydrochloric acid was placed in a continuous liquid/liquid glass extraction vessel along with 3500 milliliters of ether. The ratio of ether to aqueous phase ratio was 1.2:1. The total admixture was allowed to be in contact in a continuous liquid/liquid glass extraction vessel overnight, i.e. for 16 hours. Thereafter, the mixture was separated into a second aqueous phase 2a and a second organic solvent phase 2b. The second aqueous phase 2a was discarded. The second organic solvent phase 2b was dried with 16 grams of anhydrous magnesium sulfate, thereafter filtered, and subsequently evaporated to yield a brown residue of 3.18 grams of a strong acid flavor laden fraction 5. The odor of the sample was noted to be strongly fruity and blueberry-like.

The first organic solvent phase 1b was made strongly basic to a pH of 11.0 by the addition of 16 grams of sodium carbonate. Thereafter the sodium carbonate first organic solvent phase 1b mixture was placed in a continuous liquid/liquid glass extraction vessel and allowed to remain in contact overnight, i.e., for 16 hours. Thereafter, the mixture was separated into a third organic solvent phase 3b which was discarded and a third aqueous phase 3a which was subsequently treated. The third aqueous phase 3a was acidified to a pH of 1.0 by the addition of 50 milliliters of 10 molar hydrochloric acid and was thereafter admixed with 1700 milliliters of ethyl ether in a liquid/liquid glass extraction vessel. The ether to aqueous phase ratio was 1.7:1. The mixture was allowed to remain overnight, i.e., 16 hours, after which it was separated into a fourth organic solvent phase 4b which was reserved and a fourth aqueous phase 4a which was discarded. The fourth organic solvent phase 4b was dried with 16 grams of anhydrous magnesium sulfate, filtered and thereafter evaporated to leave a brown residue of a weak acid flavor laden fraction 6. The weak acid flavor laden fraction 6 was noted to have an aldehyde-like aroma.

Five hundred p.p.m. of the weak acid flavor laden fraction 6, was sprayed upon 2.1 grams of instant coffee previously prepared as described above. Thereafter the instant coffee which had been sprayed with 500 p.p.m. of the weak acid flavor laden fraction was dissolved in 150 milliliters of boiling distilled water and subsequently stirred and allowed to cool. An expert panel tasted the instant coffee flavored with the weak acid flavor laden fraction 6, and found it to be full-bodied, smooth in taste and of pleasing brew-like coffee flavor. The flavor was denoted improved compared to a control.

The strong acid flavor laden fraction 5, was utilized to prepare cups of instant coffee in the same manner as previously described for the weak acid flavor laden fraction 6. The expert panel noted a strong fruity aroma coupled with a blueberry-like but yet smooth flavor. The flavor was denoted improved compared to a control.

A mixture of the strong acid flavor laden fraction 5, and the weak acid laden fraction 6, each on a 50% by weight basis was utilized to flavor instant coffee prepared as previously described. The instant coffee which had been flavored with a combination of a weak acid flavor laden fraction 6, and the strong acid flavor laden fraction 5, was utilized to prepare cups of instant coffee beverage as previously described. The expert panel noted that the prepared cups of instant coffee were strong in fruity flavor which was dominating but yet had a noticeable richer and smoother taste than the instant coffee which was not flavored by the flavor additives of this invention.

EXAMPLE II

Three liters of thin film evaporate 1, was obtained from the pilot plant extraction operation previously described. The thin film evaporate 1, was made basic to a pH of 11.0 by the addition of 16 grams sodium carbonate and was thereafter placed in a continuous liquid/liquid glass extraction vessel along with 4.5 liters of ether. The ratio of ether to thin film evaporate was 1.5:1. The mixture remained in contact overnight, i.e. 16 hours, after which it was separated into a first aqueous phase 1a, and a first organic solvent phase 1b, which was discarded. The first aqueous phase 1a, was made acidic to a pH of 1.0 by the addition of 50 milliliters of 10 molar hydrochloric acid after which it was poured slowly into a continuous liquid/liquid glass extraction vessel along with 4500 milliliters of ether. The ratio of ether to aqueous phase was 1.5:1. The mixture was allowed to remain in contact overnight, i.e. 16 hours, after which it was separated into a second aqueous phase 2a, which was discarded, and a second organic solvent phase 2b. The second organic solvent phase 2b, was concentrated by evaporation leaving behind a residue of a clear tan colored single acidic flavor laden fraction weighing 28.42 grams. The single acidic flavor laden fraction produced had an acidic coffee note and a vinegar-like odor.

One microliter of the single acid flavor laden fraction was sprayed onto two grams of the previously prepared instant coffee. This corresponds to 500 p.p.m. by weight of dry instant coffee. The instant coffee was thereafter dissolved in 200 milliliters of distilled water and brought to a boil, stirred and allowed to cool. An expert panel in tasting the instant coffee noted that the single acid flavor laden fraction enhanced the instant coffee flavor by giving the coffee a more full-bodied and slightly fruity flavor.

EXAMPLE III

The procedure of Example I was repeated with the following changes. The first aqueous phase 1a, was not separated into a second organic phase 2b, and a second aqueous phase 2a, but was discarded. Thereafter the first organic solvent phase 1b, was treated exactly as described in Example I to yield a weak acid flavor laden fraction 6, which was utilized to flavor dry instant coffee as described in Example I. An expert panel tasted cups of instant coffee beverage prepared from the dry instant coffee and weak acid flavor laden composition and found them to be full-bodied, smooth in taste and of pleasing brew-like flavor. The flavor was denoted improved compared to a control.

When Examples I, II and III are repeated utilizing roast and ground coffee as the coffee to be flavored with the acid flavor laden fractions of this invention substantially similar results are obtained in that the subsequently brewed cups of coffee were more full bodied and richer in aromatic notes of high quality coffee such as Ethiopians.

When Examples I, II and III are repeated using sodium hydroxide, potassium hydroxide, sodium carbonate, potassium carbonate and potassium bicarbonate as the alkali basic material, sulfuric acid as the strong inorganic acid and benzene, hexane, and chlorinated hydrocarbons such as methylene chloride and ethylene dichloride, as the water immiscible organic solvent, substantially similar results are obtained in that coffee beverage brewed from the instant coffee flavored with acid flavor laden fractions enhanced the coffee flavor by giving a more full bodied, smooth coffee flavor.

What is claimed is:

1. A process of isolating from a thin film evaporate a single acid fraction, said fraction containing weak acid flavor laden components and strong acid flavor laden components, said process comprising the steps of:
    (a) admixing with said thin film evaporate alkali basic material and water immiscible organic solvent to form a first aqueous phase and a first organic solvent phase, said basic material being added in a sufficient amount to provide a pH in the range of from 10.0 to 13.0 and said organic solvent being added on a volume basis at a ratio of from 3:1 to 1:20 of organic solvent to thin film evaporate; and thereafter,
    (b) separating said first aqueous phase from said first organic solvent phase and discarding said first organic solvent phase; and thereafter,
    (c) admixing with said first aqueous phase strong inorganic acid and water immiscible organic solvent to provide a second aqueous and a second organic solvent phase, said strong inorganic acid being added in a sufficient amount to provide a pH within the range of from 1.0 to 3.0 and said organic solvent being added on a volume basis at a ratio of from 3:1 to 1:20 of organic solvent to said first aqueous phase; and thereafter,
    (d) separating said second aqueous phase from said second organic solvent phase and discarding said second aqueous phase and evaporating from said second organic solvent phase said organic solvent to yield a residue of a single acid flavor laden fraction containing strong acid flavor laden components and weak acid flavor laden components.

2. The process of claim 1 wherein the water immiscible organic solvent is ether.

3. The process of claim 1 wherein in step (a) said basic material is added in a sufficient amount to provide a pH in the range of from 11.0 to 12.0.

4. The process of claim 1 wherein said organic solvent is added at a ratio of from 2:1 to 1:3.

5. A process of isolating from a thin film evaporate a weak acid flavor laden fraction, said process comprising the steps of:
  (a) admixing with said thin film evaporate alkali basic material and water immiscible organic solvent to form a first aqueous phase and a first organic solvent phase, said basic material being added in a sufficient amount to provide a pH in the range of from 8.0 to 9.5 and said organic solvent being added on a volume basis at a ratio of from 3:1 to 1:20 of organic solvent to thin film evaporate; and thereafter,
  (b) separating said first aqueous phase from said first organic solvent phase and discarding said first aqueous phase which is not separated into a second organic solvent phase and a second aqueous phase; and thereafter,
  (c) admixing with said first organic solvent phase alkali basic material to form a third aqueous phase and a third organic solvent phase, said basic material being added in a sufficient amount to provide a pH within the range of from 9.6 to 13.0; and thereafter,
  (d) separating said third aqueous phase from said third organic solvent phase and discarding said third organic solvent phase and admixing with said third aqueous phase strong inorganic acid and water immiscible organic solvent to provide a fourth aqueous phase and a fourth organic solvent phase, said inorganic acid being added in a sufficient amount to provide a pH within the range of from 1.0 to 6.0 and said organic solvent being added on a volume basis at a ratio of from 3:1 to 1:20 of organic solvent to third aqueous phase; and thereafter,
  (e) separating said fourth aqueous phase from said fourth organic solvent phase and discarding said fourth aqueous phase and evaporating said fourth organic solvent phase to yield a residue of a weak acid flavor laden fraction.

6. The process of claim 5 wherein the water immiscible organic solvent is ether.

7. The process of claim 5 wherein said organic solvent is added at a ratio of from 2:1 to 1:3.

8. The process of claim 5 wherein the pH in step (c) is adjusted to within the range of from 11.0 to 12.0.

9. A process of isolating from a thin film evaporate a strong acid flavor laden fraction and a weak acid flavor laden fraction, said process comprising the steps of:
  (a) admixing with said thin film evaporate alkali basic material and water immiscible organic solvent to form a first aqueous phase and a first organic solvent phase, said basic material being added in a sufficient amount to provide a pH within the range of from 8.0 to 9.5 and said organic solvent being added on a volume basis at a ratio of from 3:1 to 1:20 of organic solvent to thin film evaporate; and thereafter,
  (b) separating said first aqueous phase from said first organic solvent phase; and thereafter,
  (c) admixing with said first aqueous phase strong inorganic acid and water immiscible organic solvent to provide a second aqueous phase and a second organic solvent phase, said strong inorganic acid being added in a sufficient amount to provide a pH within the range of from 1.0 to 3.0 and said organic solvent being added on a volume basis at a ratio of from 3:1 to 1:20 of organic solvent to first aqueous phase; and thereafter,
  (d) separating said second aqueous phase from said second organic solvent phase and discarding said second aqueous phase and evaporating from said second organic solvent phase said organic solvent to yield a residue of a strong acid flavor laden fraction; and
  (e) admixing with said first organic solvent phase alkali basic material to form a third aqueous phase and a third organic solvent phase, said basic material being added in a sufficient amount to provide a pH within the range of from 9.6 to 13.0; and thereafter,
  (f) separating said third aqueous phase from said third organic solvent phase and discarding said third organic solvent phase and admixing with said third aqueous phase strong inorganic acid and water immiscible organic solvent to provide a fourth aqueous phase and a fourth organic solvent phase, said inorganic acid being added in a sufficient amount to provide a pH within the range of from 1.0 to 6.0 and said organic solvent being added at a weight ratio of from 3:1 to 1:20 of organic solvent to third aqueous phase; and thereafter,
  (g) separating said fourth aqueous phase from said fourth organic solvent phase and discarding said fourth aqueous phase and evaporating said fourth organic solvent phase to yield a residue of a weak acid flavor laden fraction.

10. The process of claim 9 wherein said organic solvent is added at a ratio of from 2:1 to 1:3.

11. The process of claim 9 wherein said water immiscible organic solvent is ether.

12. The process of claim 1 wherein an additional step comprises adding to a dry instant coffee product from 100 p.p.m. to 5000 p.p.m. of said single acid flavor laden fraction.

13. The process of claim 12 where an additional step comprises adding to a dry instant coffee product with 500 p.p.m. to 700 p.p.m. of said single acid flavor laden fraction.

14. The process of claim 5 wherein an additional step comprises adding to a dry instant coffee product from 100 p.p.m. to 5000 p.p.m. of said weak acid flavor laden fraction.

15. The process of claim 14 wherein an additional step comprises adding to a dry instant coffee product from 500 p.p.m. to 700 p.p.m. of said weak acid flavor laden fraction.

16. The process of claim 9 wherein an additional step comprises adding to a dry instant coffee from 100 p.p.m. to 5000 p.p.m. of the strong acid flavor laden fraction of step (d) or the weak acid flavor laden fraction of step (g) or mixtures of both.

17. The process of claim 16 wherein an additional step comprises adding to a dry instant coffee from 500 p.p.m. to 700 p.p.m. of the strong acid flavor laden fraction of step (d) or the weak acid flavor laden fraction of step (g) or mixtures of both.

References Cited

UNITED STATES PATENTS

| | | | |
|---|---|---|---|
| 2,903,359 | 9/1959 | Bonotto | 99—71 |
| 2,933,395 | 4/1960 | Adler et al. | 99—71 |
| 3,244,530 | 4/1966 | Byer et al. | 99—71 |

FRANK W. LUTTER, Primary Examiner

W. L. MENTLIK, Assistant Examiner